US012662331B2

(12) United States Patent
Park et al.

(10) Patent No.: US 12,662,331 B2
(45) Date of Patent: Jun. 23, 2026

(54) TRANSFERRING APPARATUS FOR MATERIAL FOR ELECTRODE

(71) Applicant: SK On Co., Ltd., Seoul (KR)

(72) Inventors: Yeon Ho Park, Daejeon (KR); Dong Ik Oh, Daejeon (KR); Hwa Sun Choi, Daejeon (KR); Sang Dock Han, Daejeon (KR)

(73) Assignee: SK On Co., Ltd., Seoul (KR)

( * ) Notice: Subject to any disclaimer, the term of this patent is extended or adjusted under 35 U.S.C. 154(b) by 263 days.

(21) Appl. No.: 18/343,761

(22) Filed: Jun. 29, 2023

(65) Prior Publication Data

US 2024/0043226 A1    Feb. 8, 2024

(30) Foreign Application Priority Data

Aug. 2, 2022    (KR) ........................ 10-2022-0095877

(51) Int. Cl.
*B65G 47/90*        (2006.01)

(52) U.S. Cl.
CPC .................................... *B65G 47/90* (2013.01)

(58) Field of Classification Search
CPC .............................. B65G 47/90; B65H 19/123
See application file for complete search history.

(56) References Cited

U.S. PATENT DOCUMENTS

| | | | | |
|---|---|---|---|---|
| 4,589,811 A | * | 5/1986 | Riccardo | B65H 19/123 |
| | | | | 198/463.6 |
| 4,708,300 A | * | 11/1987 | Goetz | B65H 19/126 |
| | | | | 242/561 |

| | | | | |
|---|---|---|---|---|
| 5,031,381 A | * | 7/1991 | Focke | B65H 19/123 |
| | | | | 242/559.2 |
| 5,205,505 A | * | 4/1993 | Focke | B65B 41/12 |
| | | | | 242/559.3 |
| 5,209,247 A | * | 5/1993 | Rittershaus | A24C 5/20 |
| | | | | 131/58 |
| 5,699,979 A | * | 12/1997 | Spada | B65H 19/123 |
| | | | | 242/563.2 |
| 5,735,782 A | | 4/1998 | Berg | |

(Continued)

FOREIGN PATENT DOCUMENTS

| | | |
|---|---|---|
| EP | 1205413 A2 | 5/2002 |
| EP | 1413538 A2 | 4/2004 |

(Continued)

OTHER PUBLICATIONS

Extended European Search Report for the European Patent Application No. 23183159.5 issued by the European Patent Office on Jan. 12, 2024.

*Primary Examiner* — Saul Rodriguez
*Assistant Examiner* — Brendan P Tighe
(74) *Attorney, Agent, or Firm* — IP & T GROUP LLP

(57) ABSTRACT

A transfer apparatus for a material for an electrode according to an embodiment of the disclosed technology includes an apparatus body; a gripping device configured to grip a reel wound around a current collector; a first moving device connected to the gripping device and the apparatus body and configured to move the gripping device; a position changing device configured to rotate the reel when the reel is seated; and a first discharge device disposed on one side of the apparatus body and configured to discharge the reel to the outside of the apparatus body when the rotated reel is seated.

13 Claims, 14 Drawing Sheets

(56)     References Cited

U.S. PATENT DOCUMENTS

| | | | | |
|---|---|---|---|---|
| 6,767,318 | B2 * | 7/2004 | Spatafora | B65H 19/123 |
| | | | | 493/305 |
| 7,546,971 | B2 * | 6/2009 | Pappas | B65H 19/123 |
| | | | | 242/533.7 |
| 9,573,713 | B2 * | 2/2017 | Huber | B65H 19/12 |
| 9,656,823 | B2 * | 5/2017 | Jendroska | B65H 19/305 |
| 9,926,160 | B2 * | 3/2018 | Macura | B65H 19/1805 |
| 10,683,183 | B2 * | 6/2020 | Perini | B65H 19/12 |
| 10,793,384 | B2 * | 10/2020 | Nagafuchi | B65H 19/12 |
| 11,958,705 | B2 * | 4/2024 | Han | B65H 19/123 |
| 12,195,289 | B2 * | 1/2025 | Swann | B65H 19/30 |
| 12,434,934 | B2 * | 10/2025 | Yang | B65H 19/12 |
| 12,466,680 | B2 * | 11/2025 | Yamane | B65B 41/16 |
| 2010/0154355 | A1 * | 6/2010 | Freudenberg | B65H 19/123 |
| | | | | 242/559 |
| 2010/0237180 | A1 * | 9/2010 | Matos | B65H 19/12 |
| | | | | 242/533.7 |
| 2011/0104539 | A1 | 5/2011 | Oh et al. | |
| 2015/0090831 | A1 * | 4/2015 | Huber | B65H 19/18 |
| | | | | 242/555.3 |
| 2017/0233206 | A1 * | 8/2017 | Wimmer | B65H 19/123 |
| | | | | 242/554 |
| 2017/0240378 | A1 * | 8/2017 | Perini | B65H 19/126 |

FOREIGN PATENT DOCUMENTS

| | | | | | |
|---|---|---|---|---|---|
| EP | 2223876 | A2 | 9/2010 | | |
| JP | H10-506330 | A | 6/1998 | | |
| KR | 10-1192056 | B1 | 10/2012 | | |
| KR | 10-2016-0133264 | A | 11/2016 | | |
| KR | 10-1857396 | B1 | 5/2018 | | |
| WO | WO-2009050332 | A1 * | 4/2009 | | B65H 19/126 |
| WO | 2016046852 | A1 | 3/2016 | | |

* cited by examiner

TRANSFERRING APPARATUS FOR MATERIAL FOR ELECTRODE

CROSS-REFERENCE TO RELATED APPLICATION(S)

This application claims benefit of priority to Korean Patent Application No. 10-2022-0095877 filed on Aug. 2, 2022 in the Korean Intellectual Property Office, the disclosure of which is incorporated herein by reference in its entirety.

TECHNICAL FIELD

The technology and implementations disclosed in this patent document generally relate to a material for an electrode.

BACKGROUND

Secondary batteries are widely used not only in small electronic devices such as mobile phones and laptops, but also in medium and large mechanical devices such as electric vehicles (EVs), and have the advantage of being rechargeable and reusable.

Such a secondary battery may be manufactured by accommodating an electrode assembly including a positive electrode plate, a negative electrode plate, and a separator in a case, injecting an electrolyte solution into the case, and then sealing the case.

A secondary battery manufacturing process is largely divided into an electrode process of manufacturing a positive electrode plate and a negative electrode plate, an assembly process of forming an electrode assembly with a positive electrode plate, a negative electrode plate, and a separator, and impregnating the electrode assembly into an electrolyte solution, and a chemical process of imparting electrical characteristics to the electrode assembly and testing the performance of the electrode assembly.

From thereamong, the electrode process may include a process of coating a current collector with a positive active material and a negative active material, a process of rolling the coated current collector, and a slitting process of cutting the rolled current collector to meet electrode specifications.

Efficient transfer and management of materials during these processes may be considered to improve a battery manufacturing efficiency.

SUMMARY

The disclosed technology can be implemented in some embodiments to provide an apparatus to automate a transfer operation of a material for an electrode and improve a transfer efficiency of the material for the electrode.

Also, the disclosed technology can be implemented in some embodiments to provide an apparatus to improve an efficiency of a battery manufacturing process.

However, the objects of the disclosed technology are not limited to the above, and will be more easily understood in the process of describing specific embodiments of the disclosed technology.

In some embodiments of the disclosed technology, a transfer apparatus for a material for an electrode includes an apparatus body; a gripping device configured to grip a reel wound around a current collector; a first moving device connected to the gripping device and the apparatus body and configured to move the gripping device; a position changing device configured to rotate the reel when the reel is seated; and a first discharge device disposed on one side of the apparatus body and configured to discharge the reel to the outside of the apparatus body when the rotated reel is seated.

In some embodiments of the disclosed technology, the transfer apparatus may further include a second discharge device disposed on the apparatus body and configured to discharge the reel to the outside of the apparatus body when the reel is seated.

In some embodiments of the disclosed technology, the reel may include a first reel gripped in a first position and a second reel gripped in a second position, and the gripping device may have the first reel seated on the position changing device and the second reel seated on the second discharge device.

In some embodiments of the disclosed technology, the position changing device may receive the first reel with a first side of the first reel facing the gripping device and rotate the first reel so that a second side of the first reel faces the gripping device.

In some embodiments of the disclosed technology, the first position may be a position corresponding to a first outlet of a first slitter, and the second position may be a position corresponding to a second outlet of a second slitter.

In some embodiments of the disclosed technology, the first discharge device may include a first conveyor device receiving the first reel and moving the first reel along a first path, and the second discharge device may include a second conveyor device receiving the second reel and moving the second reel along a second path.

In some embodiments of the disclosed technology, the gripping device may include a gripping body connected to the first moving device; and a gripping shaft connected to the gripping body and into which the reel is inserted.

In some embodiments of the disclosed technology, the first moving device may include a first gripping moving device configured to move the gripping body in a first direction from the apparatus body; a second gripping moving device configured to move the gripping body in a second direction from the apparatus body; and a third gripping moving device configured to move the gripping body in a third direction from the apparatus body.

In some embodiments of the disclosed technology, each of the first gripping moving device, the second gripping moving device, and the third gripping moving device may include a ball screw installed on the apparatus body or the gripping body; a motor member rotating the ball screw; and a transfer nut connected to the ball screw and the gripping body.

In some embodiments of the disclosed technology, each of the first discharge device and the second discharge device may include a discharge body disposed in the apparatus body; a discharge shaft connected to the discharge body and on which the reel discharged from the gripping device is seated; and a finger device configured to move the reel from the gripping device to the discharge shaft when the gripping device and the discharge shaft face each other.

In some embodiments of the disclosed technology, the first discharge device and the second discharge device may further include a discharge frame disposed to face the discharge body, and the finger device includes a finger frame connected to the discharge frame so as to be moved from the discharge frame; and at least one finger member connected to the finger frame so as to be moved from the finger frame, holding the reel present in the gripping device, and moving the reel to the discharge shaft.

In some embodiments of the disclosed technology, the position changing device may include a position changing plate on which the reel is seated; and a position changing moving device connected to the position changing plate and configured to rotate the position changing plate, and the position changing plate may include an inclined region in a surface on which the reel is seated.

In some embodiments of the disclosed technology, the inclined region may include a first inclined region contacting an outer circumferential surface of the reel and inclined in a first direction; and a second inclined region contacting the outer circumferential surface of the reel and inclined in a second direction.

BRIEF DESCRIPTION OF DRAWINGS

Certain aspects, features, and advantages of the disclosed technology are illustrated by the following detailed description with reference to the accompanying drawings.

DETAILED DESCRIPTION

Figure 1:
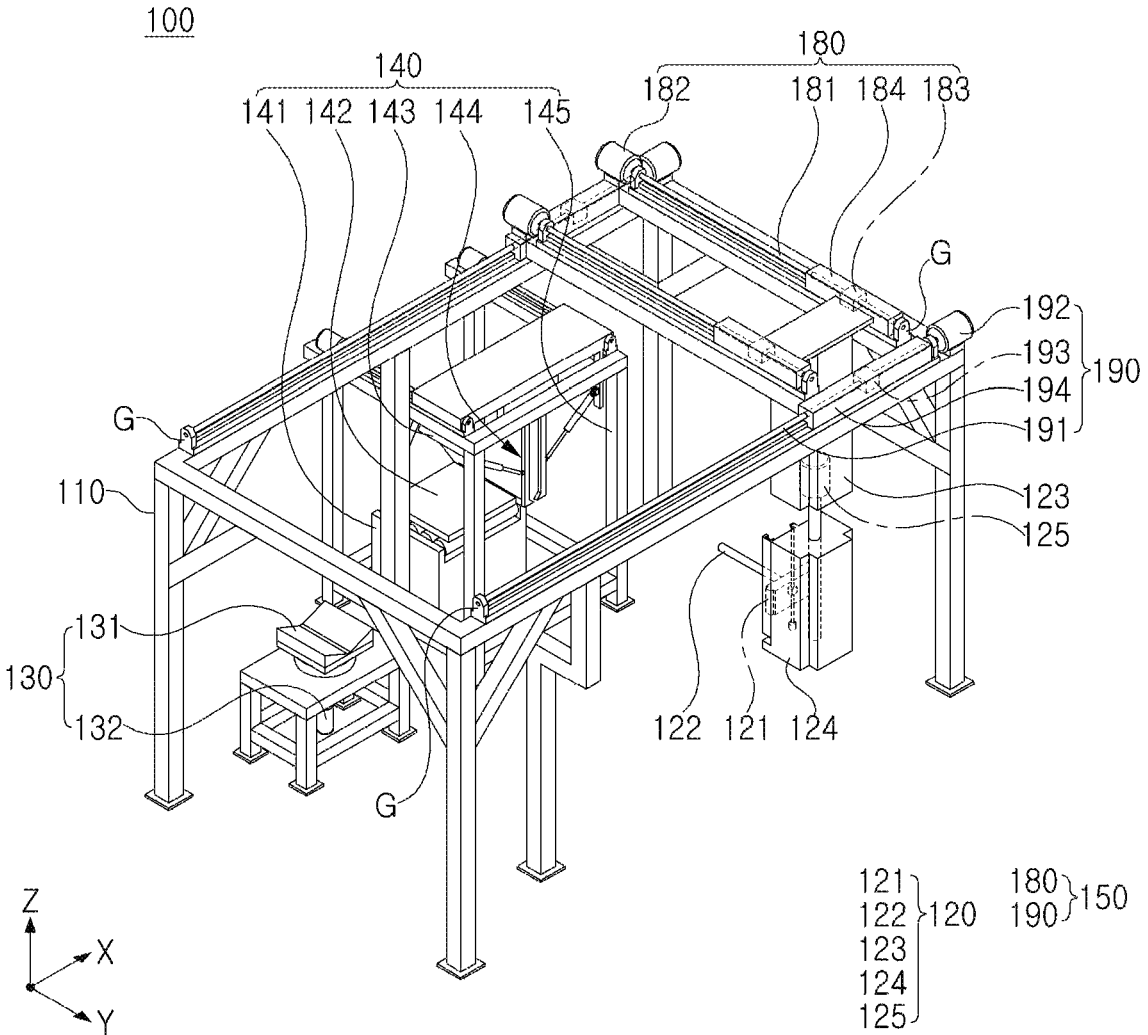
FIG. 1 is a perspective view of a transfer apparatus for a material for an electrode according to an embodiment of the disclosed technology.

Features of the disclosed technology disclosed in this patent document are described by example embodiments with reference to the accompanying drawings.

Elements described with the same reference numerals in the accompanying drawings to help understanding of the description of the embodiments of the disclosed technology are the same elements, and among the elements having the same action, related elements are indicated by numbers on the same or extended line.

In addition, in order to clarify the gist of the disclosed technology, descriptions of well-known elements and technologies will be omitted by the prior art, and hereinafter, the disclosed technology will be described in detail with reference to the accompanying drawings.

However, the spirit of the disclosed technology is not limited to the presented embodiments, and may be suggested in other forms in which specific components are added, changed, or deleted by those skilled in the art, but this is also included within the scope of the same spirit as the disclosed technology.

FIG. 1 is a perspective view of a transfer apparatus 100 for a material for an electrode according to an embodiment of the disclosed technology.

As shown in FIG. 1, the transfer apparatus 100 for the material for the electrode according to an embodiment of the disclosed technology may include an apparatus body 110 installed in a path on which the material for the electrode is transferred, and a gripping device 120 installed in the apparatus body 110 and moving the material for the electrode in the apparatus body 110.

The apparatus body 110 may be installed in the form of a gantry and may be installed throughout the transfer path of the material for the electrode.

For example, the apparatus body 110 may be installed in a region corresponding to an end of a slitting apparatus before an assembly process.

In the disclosed technology, the material for the electrode may be a material for manufacturing the electrode, and may be, for example, a reel wound around a current collector coated with an electrode active material.

The gripping device 120 may be provided to hold and fix a reel 10.

The gripping device 120 may be provided to move along the apparatus body 110 by holding and fixing the reel 10, and the gripping device 120 may move the reel 10 in the apparatus body 110.

A position changing device 130 may be installed in the apparatus body 110.

The position changing device 130 may be provided to rotate the reel 10 by at least 180° and change a position of the reel 10 when the reel 10 is seated.

The reel 10 may be seated on the position changing device 130 by the gripping device 120 while being fixed to the gripping device 120.

The gripping device 120 may move forward in a direction closer to the position changing device 130 to make the reel 10 seated on the position changing device 130, and then move backward in a direction away from the position changing device 130 to be moved away from the position changing device 130 without the reel 10.

When the position changing device 130 completes the rotation of the reel 10, the gripping device 120 may move forward again in the direction closer to the position changing device 130 to pick up the reel 10 from the position changing device 130, and then move backward in the direction away from the position changing device 130 together with the reel 10.

One side of the reel 10 facing the gripping device 120 before the reel 10 is seated on the position changing device 130 may not face the gripping device 120 after the reel 10 completely rotates in the position changing device 130.

As described above, the position changing device 130 may be provided to rotate the reel 10 so that one side of the reel 10 facing the gripping device 120 before being seated on the position changing device 130 does not face the gripping device 120 after a position change is completed.

This is to change the position of an uncoated region 11 in the current collector, and a coated region, which is a region coated with an electrode active material, and the uncoated region 11, which is a region that is not coated with the electrode active material, may exist in the current collector.

Accordingly, the current collector has a directionality, and the directionality of the current collector is considered by various devices for manufacturing batteries.

Therefore, in a battery manufacturing process, the consistently supplying the current collector to a post-process may be considered. In particular, the supplying the current collector to the post-process while consistently maintaining the direction of the uncoated region 11 of the current collector may be considered.

According to the position changing device 130 of the disclosed technology, the uncoated regions 11 of the plurality of reels 10 supplied in a preceding process may exist at the same position.

This may contribute to improving an efficiency of the battery manufacturing process as well as quickly and smoothly proceeding of the post-process.

The transfer apparatus 100 for the material for the electrode according to an embodiment of the disclosed technology may include a first moving device 150 for moving the gripping device 120 holding the reel 10 in the apparatus body 110 and a first discharge device 140 installed on one side of the apparatus body 110 and discharging the completely rotated reel 10 to the outside of the apparatus body 110.

First, the gripping device 120 may be connected to the apparatus body 110 by the first moving device 150 and may be moved from the apparatus body 110 by the first moving device 150.

The gripping device 120 may include a gripping body 121 connected to the first moving device 150 and a gripping shaft 122 extending from the gripping body 121.

The first moving device 150 may include a first gripping moving device (170 of FIG. 2) connected to the gripping body 121 and moving the gripping body 121 from the apparatus body 110 in a first direction, a second gripping moving device 180 connected to the gripping body 121 and moving the gripping body 121 from the apparatus body 110 in a second direction, and a third gripping moving device 190 connected to the gripping body 121 and moving the gripping body 121 from the apparatus body 110 in a third direction.

Here, the first direction is a Z-axis direction, the second direction is a Y-axis direction, and the third direction is an X-axis direction.

However, since X, Y, and Z axes are arbitrarily set directions for convenience of description, these directions may be appropriately changed and applied in consideration of process characteristics.

The second gripping moving device 180 may include a second motor member 182 installed on the third gripping moving device 190 and provided to rotate, a second ball screw 181 connected to a rotation shaft (not shown) of the second motor member 182 through a reducer, a second transfer nut 183 engaged with the second ball screw 181 and provided to linearly move by a rotational movement of the second ball screw 181, and a first transfer block 184 connected to the second transfer nut 183 and moved by the second transfer nut 183.

The second motor member 182 may rotate in a clockwise direction or in a counterclockwise direction, and the second ball screw 181 may be disposed parallel to the Y-axis.

The second transfer nut 183 may be provided to linearly move in the Y-axis direction by rotation of the second ball screw 181.

The first transfer block 184 may be connected to the second transfer nut 183 and moved in +Y and −Y directions by the second transfer nut 183.

A passage through which the second ball screw 181 passes and a space where the second transfer nut 183 is disposed may exist inside the first transfer block 184.

A plurality of second gripping moving devices 180 may be provided, and the plurality of second gripping moving devices 180 may be disposed parallel to the Y-axis direction.

The plurality of second gripping moving devices 180 may be spaced apart from each other by a predetermined distance in the X-axis direction, and may be connected to the gripping device 120, respectively.

According to this, a driving force for moving the gripping device 120 may be strengthened, and the gripping device 120 may move from the apparatus body 110 without vibration or assault.

The third gripping moving device 190 may be fixed to the apparatus body 110 and disposed parallel to the X axis.

The third gripping moving device 190 may support the second gripping moving device 180 and move the second gripping moving device 180 in the +X and −X directions so that the gripping device 120 may be moved in the +X and −X directions.

The third gripping moving device 190 may include a third motor member 192 installed on the apparatus body 110 and provided to rotate in a clockwise direction or in a counterclockwise direction, a third ball screw 191 connected to a rotation shaft (not shown) of the third motor member 192 by a reducer and disposed parallel to the X axis, a third transfer nut 193 engaged with the third ball screw 191 and provided to linearly move in the +X and −X directions by the rotation of the third ball screw 191, and a second transfer block 194 connected to the third transfer nut 193 and provided to be moved in the +X and −X directions by the third transfer nut 193.

A plurality of third gripping moving devices 190 may be provided in the apparatus body 110, and the plurality of third gripping moving devices 190 may be disposed parallel to the X axis.

The plurality of third gripping moving devices 190 may be spaced apart from each other by a predetermined distance in the Y-axis direction.

In addition, at least any one or more of the second transfer nut 183, the first transfer block 184, the third transfer nut 193, and the second transfer block 194 may be moved in engagement with a guide member G.

The guide member G may be an LM guide.

The guide member G may contribute to facilitating the movement of the second transfer nut 183, the first transfer block 184, the third transfer nut 193, and the second transfer block 194, reducing vibration during the movement of the second transfer nut 183, the first transfer block 184, the third transfer nut 193, and the second transfer block 194, and minimizing damage to the second transfer nut 183, the first transfer block 184, the third transfer nut 193, and the second transfer block 194.

The gripping device 120 may include a first gripping block 123 connected to the first transfer block 184 and extending in the −Z direction, and a second gripping block 124 connected to the first gripping block 123 and extending from the first gripping block 123 in the −Z direction.

A gripping driving member 125 capable of rotating in a clockwise direction or in a counterclockwise direction on an X-Y plane may be provided inside the first gripping block 123.

The gripping driving member 125 may be a cylinder capable of rotating in a clockwise direction or in a counterclockwise direction.

However, this is not necessarily limited by the disclosed technology, and may be replaced by a motor, etc.

The gripping driving member 125 may be connected to the second gripping block 124 and may be configured to rotate the second gripping block 124 in a clockwise direction or in a counterclockwise direction on the X-Y plane.

The second gripping block 124 may include the gripping body 121 and the gripping shaft 122 extending from the gripping body 121 and on which the reel 10 is seated.

The gripping body 121 and the gripping shaft 122 may be provided to move in the +Z and −Z directions in the second gripping block 124.

On the other hand, the position changing device 130 may include a position changing plate 131 disposed on one side of the apparatus body 110, and on which the reel 10 is seated by the gripping device 120, and a position changing moving device 132 connected to the position changing plate 131 and rotating the position changing plate 131.

The first discharge device 140 may be disposed on one side of the position changing device 130 in the apparatus body 110.

The reel 10 in which a direction of the uncoated region 11 is changed through the position changing device 130 may be seated on the first discharge device 140.

To this end, the gripping device 120 may pick up the completely rotated reel 10 from the position changing device 130 and make the reel 10 seated on the first discharge device 140.

The first discharge device 140 may include a first discharge body 142 disposed on the apparatus body 110, a first discharge shaft 143 connected to the first discharge body 142 and on which the reel 10 discharged from the gripping device 120 is seated, and a finger device moving the reel 10 from the gripping device 120 to the first discharge shaft 143 when the gripping device 120 and the first discharge shaft 143 face each other.

In an embodiment of the disclosed technology, the first discharge body 142 may be supported by a first conveyor device 141 and provided to be moved along the first conveyor device 141.

Therefore, the reel 10 inserted into the first discharge shaft 143 may be moved along the first conveyor device 141 together with the first discharge body 142.

The first conveyor device 141 may exist inside and outside the apparatus body 110.

The first conveyor device 141 may be configured to extend from the apparatus body 110 to the post-process of the reel 10, and provided to transfer the reel 10 to the post-process.

Also, the first conveyor device 141 may be provided to move the first discharge body 142 on which the reel 10 is seated to the post-process of the reel 10, and then to return the first discharge body 142 from which the reel 10 is discharged and not seated to the apparatus body 110 which is an initial position again.

Therefore, the first discharge body 142 which has completely supplied the reel 10 to the post-process may wait for a pickup of the next reel 10 in the apparatus body 110.

Figure 2:
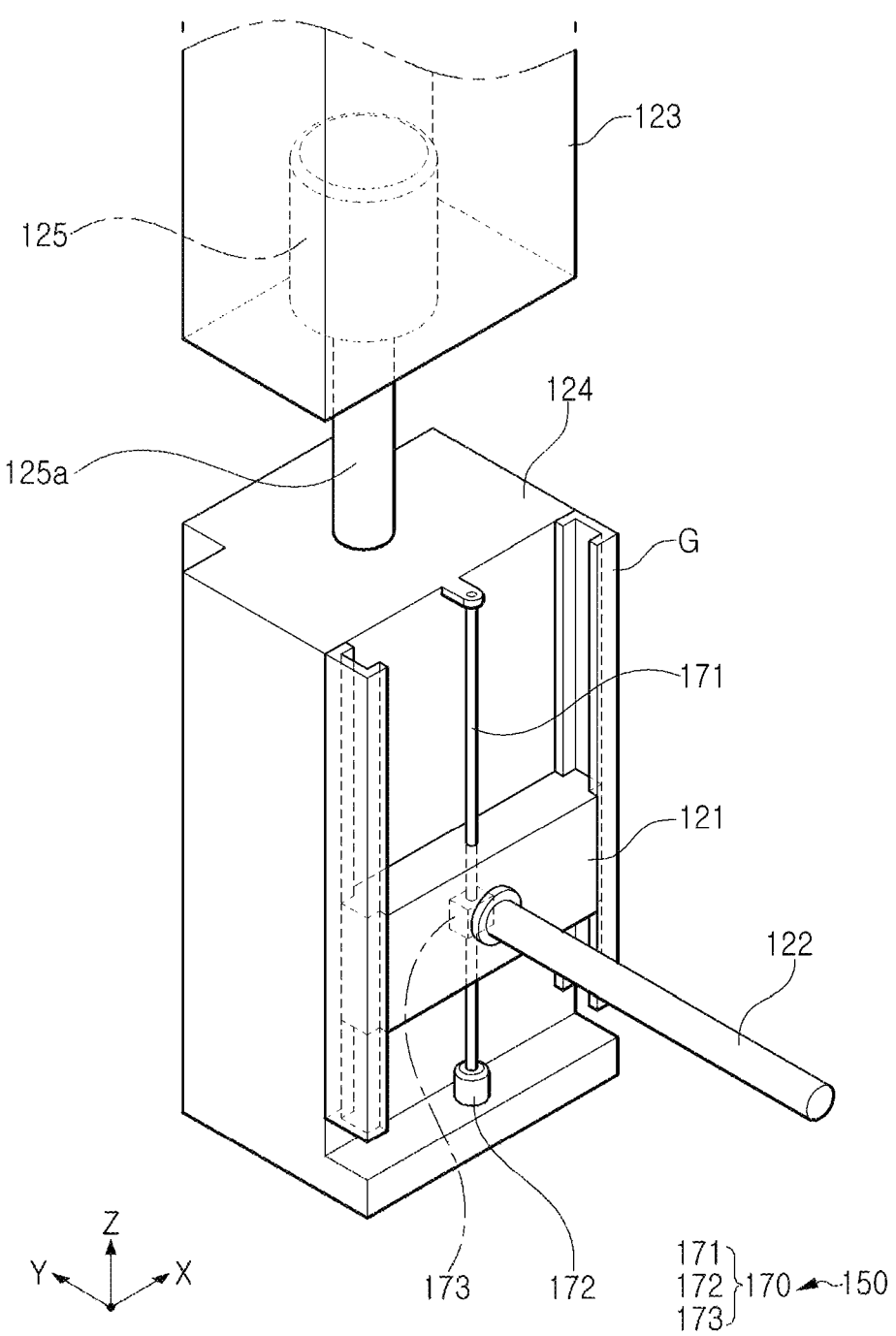
FIG. 2 is a partial perspective view of a gripping device and a first gripping moving device according to an embodiment of the disclosed technology.

FIG. 2 is a partial perspective view of the gripping device 120 and the first gripping moving device 170 according to an embodiment of the disclosed technology.

As shown in FIG. 2, the first gripping moving device 170 according to an embodiment of the disclosed technology may be provided to move the gripping body 121 in the +Z and −Z directions in the second gripping block 124.

The first gripping moving device 170 may include a first motor member 172 disposed on the second gripping block 124 and provided to rotate in a clockwise direction or in a counterclockwise direction, a first ball screw 171 connected to a rotation shaft (not shown) of the first motor member 172 by a reducer and disposed parallel to the Z axis, and a first transfer nut 173 engaged with the first ball screw 171 and provided to linearly move in the +Z and −Z directions by a rotation of the first ball screw 171.

A passage through which the first ball screw 171 passes and a space in which the first transfer nut 173 is disposed may exist inside the gripping body 121.

The first transfer nut 173 may be fixed to the gripping body 121 to be moved in the +Z and −Z directions according to a movement of the first transfer nut 173.

The guide member G may be disposed on the second gripping block 124.

The guide member G may be an LM guide, disposed parallel to the Z axis, and engaged with the gripping body 121.

The gripping body 121 may be stably moved on the second gripping block 124 by the guide member G without a vibration.

As described above, the gripping driving member 125 may be disposed inside the first gripping block 123, and a rotation shaft 125a of the gripping driving member 125 may exist outside the first gripping block 123.

The rotation shaft 125a may be connected to the second gripping block 124, and the second gripping block 124 may rotate and move by the rotation of the rotation shaft 125a.

Figure 3:
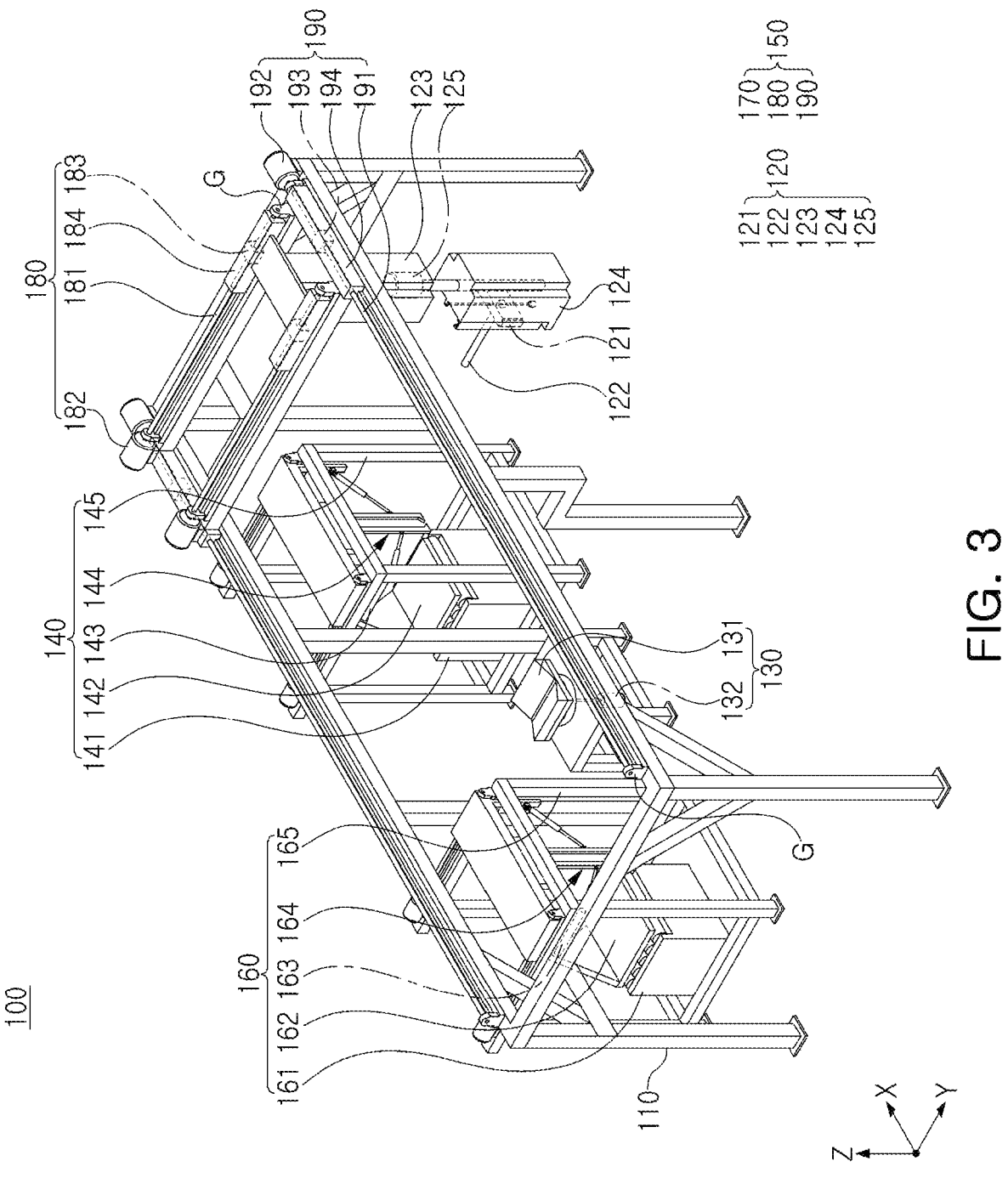
FIG. 3 is a perspective view of a transfer apparatus for a material for an electrode according to another embodiment of the disclosed technology.

FIG. 3 is a perspective view of the transfer apparatus 100 for the material for the electrode according to another embodiment of the disclosed technology.

As shown in FIG. 3, the transfer apparatus 100 for the material for the electrode according to another embodiment of the disclosed technology may further include a second discharge device 160 disposed on the other side of the position changing device 130.

The gripping device 120 may pick up the reel 10 to enter the apparatus body 110, and then, have the reel 10 seated on the position changing device 130 or the second discharge device 160.

As described above, the reel 10 seated on the position changing device 130 may be picked up by the gripping device 120 again and seated on the first discharge device 140 after a direction change of the reel 10 is completed.

Thereafter, the reel 10 may be discharged to the outside of the apparatus body 110 by the first discharge device 140.

On the other hand, the reel 10 that is not seated on the position changing device 130 but is directly seated on the second discharge device 160 by the gripping device 120 may be discharged to the outside of the apparatus body 110 by the second discharge device 160 without a direction change of the reel 10.

At this time, the first discharge device 140 may discharge the reel 10 through a first path, and the second discharge device 160 may discharge the reel 10 through a second path.

The first path may be a first post-process of the reel 10, and the second path may be a second post-process of the reel 10.

Alternatively, the first path may extend to a first inlet of a post-processing apparatus of the reel 10, and the second path may extend to a second inlet of the post-processing apparatus of the reel 10.

Here, the post-processing apparatus of the reel 10 may be one apparatus.

As shown in FIG. 3, when the position changing device 130 is disposed between the first discharge device 140 and the second discharge device 160, there are advantages capable of minimizing a moving line of the gripping device 120 and quickly transferring the reel 10.

In an embodiment of the disclosed technology, the second discharge device 160 may include a second discharge body 162 disposed on the apparatus body 110, a second discharge shaft 163 connected to the second discharge body 162 and on which the reel 10 discharged from the gripping device 120 is seated, and a second finger device 164 moving the reel 10 from the gripping device 120 to the second discharge shaft 163 when the gripping device 120 and the second discharge shaft 163 face each other.

In an embodiment of the disclosed technology, the second discharge shaft 163 may be provided in the second discharge body 162, and the reel 10 may be inserted into the second discharge shaft 163.

The second discharge body 162 may be supported by the second conveyor device 161, and the second discharge body 162 may be moved along the second conveyor device 161.

Therefore, the reel 10 inserted into the second discharge shaft 163 may be moved along the second conveyor device 161 together with the second discharge body 162. The second conveyor device 161 may exist inside the apparatus body 110 and outside the apparatus body 110.

The second conveyor device 161 may be configured to extend from the apparatus body 110 to the post-process of the reel 10, and may be provided to transfer the reel 10 to the post-process.

The second conveyor device 161 may be disposed on the second path, and the above-described first conveyor device 141 may be disposed on the first path.

The second conveyor device 161 may be provided to move the second discharge body 162 on which the reel 10 is seated to the post-process of the reel 10 along the second path, and then to return the second discharge body 162 from which the reel 10 is discharged and not seated to the apparatus body 110 which is an initial position again.

Therefore, the second discharge body 162 which has completely supplied the reel 10 to the post-process may wait for a pickup of the next reel 10 in the apparatus body 110.

In an embodiment of the disclosed technology, the first discharge device 140 may further include a first discharge frame 145, and the second discharge device 160 may further include a second discharge frame 165.

The first discharge frame 145 and the second discharge frame 165 may be connected to the apparatus body 110, a first finger device 144 may be installed in the first discharge frame 145, and the second finger device 164 may be installed in the second discharge frame 165.

Also, the first finger device 144 may be provided to be moved in the +Y and −Y directions in the first discharge frame 145, and the second finger device 164 may be provided to be moved in the +Y and −Y directions in the second discharge frame 165.

Accordingly, the first finger device 144 and the second finger device 164 may move the reel 10 in the +Y and −Y directions.

Meanwhile, in an embodiment of the disclosed technology, the position changing device 130, the first discharge device 140, the second discharge device 160, the first moving device 150, the first conveyor device 141 and the second conveyor device 161 may be connected to a control device (not shown).

Figure 4:
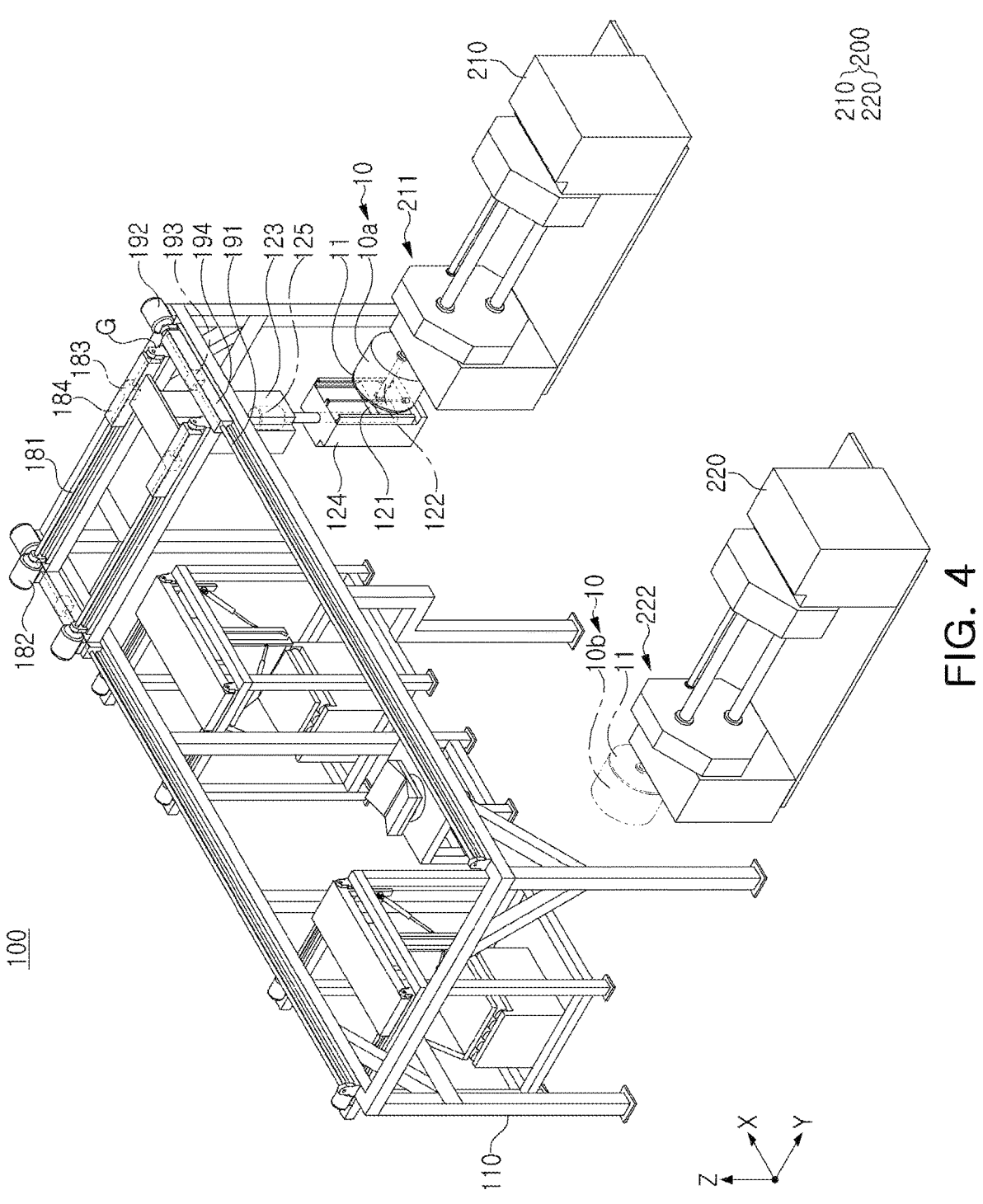
FIG. 4 schematically illustrates a state where the transfer apparatus for the material for the electrode shown in FIG. 3 picks up a reel at a rear end of a slitter.

The control device (not shown) may be provided to transmit a control signal capable of controlling a moving speed, a moving distance, etc. of each of devices, and receive position information of each of devices and the reel (10 of FIG. 4).

To this end, a sensor (not shown) for position detection may be additionally installed in the apparatus body 110, and the sensor (not shown) may also be connected to the control device (not shown).

According to this, since automatic control of the transfer apparatus 100 for the material for the electrode is possible, precision, accuracy and convenience of an operation may be improved.

FIG. 4 schematically shows a state where the transfer apparatus 100 for the material for the electrode shown in FIG. 3 picks up the reel 10 at a rear end of a slitter 200.

As shown in FIG. 4, in an embodiment of the disclosed technology, the apparatus body 110 may be disposed close to a position where the slitter 200 discharges the reel 10.

Accordingly, the reel 10 discharged from the slitter 200 may be quickly picked up and efficiently supplied to the post-process.

The slitter 200 is an apparatus used in a slitting process and cutting a current collector coated with an electrode active material and completely rolled to fit a designed electrode size.

The slitter 200 may cut the current collector into device standards and then wind and discharge the current collector in the form of the reel 10.

The slitter 200 may include a first slitter 210 and a second slitter 220 disposed adjacent to the first slitter 210.

The first slitter 210 may discharge the reel 10 through a first outlet 211, and the second slitter 220 may discharge the reel 10 through a second outlet 222.

The first outlet 211 may correspond to a first position and discharge a first reel 10*a*.

The first reel 10*a* which is the reel 10 discharged from the first outlet 211 may be in a state where the uncoated region 11 which is not coated with an active material faces the gripping body 121.

The second outlet 222 may correspond to a second position, and a second reel 10*b* which is the reel 10 discharged from the second outlet 222 may be in a state where the uncoated region 11 does not face the gripping body 121.

As described above, the first reel 10*a* discharged from the first slitter 210 and the second reel 10*b* discharged from the second slitter 220 have different positions where the uncoated region 11 is disposed.

The first reel 10*a* may be inserted into the gripping shaft 122 at the first position, and the second reel 10*b* may be inserted into the gripping shaft 122 at the second position.

Both sides of the first reel 10*a* may be disposed parallel to the X-Z plane, respectively.

Among both sides of the first reel 10*a*, a side on which the uncoated region 11 exists may be a first side, and another side facing the first side may be a second side.

In the first reel 10*a* inserted into the gripping shaft 122 at the first position, the first side may face the gripping body 121, and the second side may not face the gripping body 121.

The gripping body 121 may transfer the first reel 10*a* picked up at the first position to the position changing device (130 in FIG. 3) to change the positions of the first side and the second side, and then transfer the first reel 10*a* to the first discharge device (140 in FIG. 3).

The first reel 10*a* completely rotated by the position changing device (130 in FIG. 3) may be inserted into the gripping shaft 122 with the first side facing the gripping body 121.

The gripping body 121 may transfer the first reel 10a in this state to the first discharge device (140 in FIG. 3) so that the first reel 10a is discharged to the outside of the apparatus body 110.

The first reel 10a may be discharged to the outside of the apparatus body 110 while the first side on which the uncoated region 11 is formed is facing the apparatus body 110.

Meanwhile, both sides of the second reel 10b may be placed parallel to the X-Z plane, respectively.

Among both sides of the second reel 10b, a side on which the uncoated region 11 exists may be a first side, and another side facing the first side may be a second side.

In the second reel 10b inserted into the gripping shaft 122 at the second position, the first side may not face the gripping body 121, and the second side may face the gripping body 121.

The gripping body 121 may transfer the second reel 10b picked up at the second position to the second discharge device (160 in FIG. 3).

Like the first reel 10a, the second reel 10b may be discharged to the outside of the apparatus body 110 while the first side on which the uncoated region 11 is formed is facing the apparatus body 110.

The transfer apparatus 100 for the material for the electrode according to the disclosed technology is configured to pick up the first reel 10a and the second reel from the rear end of the slitter 200 to have the uncoated region 11 of the first reel 10a and the uncoated region 11 of the second reel 10b disposed in the same direction, and then, discharge the first reel 10a and the second reel 10b to the outside of the apparatus body 110.

In an embodiment of the disclosed technology, the first reel 10a is inserted into the gripping shaft 122 and then seated on the position changing device (130 in FIG. 3), inserted into the gripping shaft 122 again and seated on the first discharge device (140 in FIG. 3) and discharged through the first path by the first path by the first discharge device (140 in FIG. 3).

On the other hand, the second reel 10b is inserted into the gripping shaft 122 and then on the second discharge device (160 in FIG. 3), and discharged through the second path by the second discharge device (160 in FIG. 3).

According to the disclosed technology, in the first reel 10a seated on the first discharge body (142 in FIG. 3) and the second reel 10b seated on the second discharge body (162 in FIG. 3), the uncoated regions 11 have the same direction.

That is, in the first reel 10a, the uncoated region 11 faces one side of the first discharge body (142 in FIG. 3) existing on the X-Z plane, and the uncoated region 11 of the second reel 10b also faces one side of the second discharge body (162 in FIG. 3) existing on the X-Z plane.

Therefore, the first reel 10a and the second reel are discharged to the outside of the apparatus body 110 while the uncoated regions 11 are disposed in the same direction.

Meanwhile, an operation of inserting the reel 10 into the gripping shaft 122 may be performed manually by an operator or automatically by an apparatus.

Figure 5:
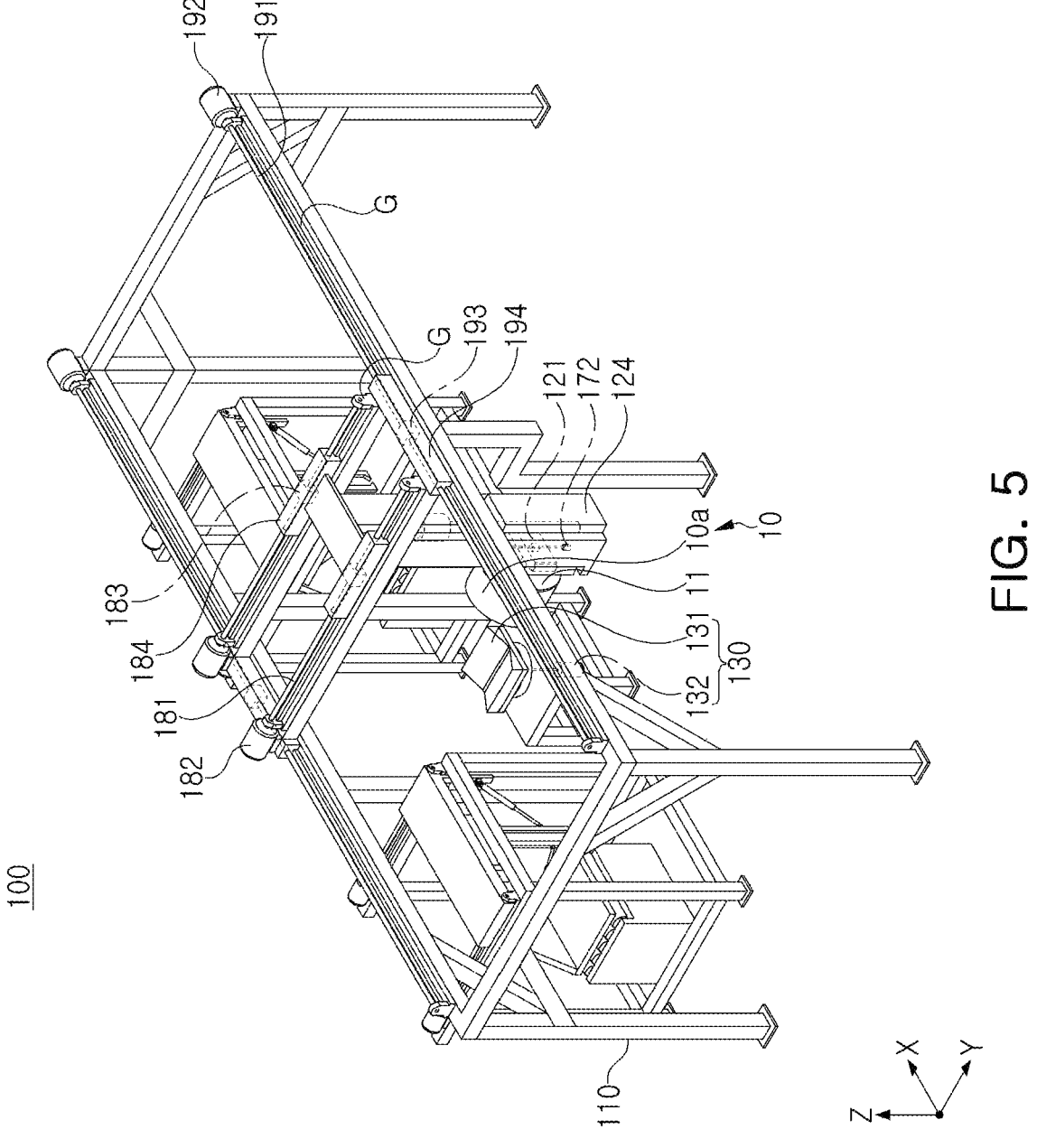
FIG. 5 is an operating state diagram of a transfer apparatus for a material for an electrode according to an embodiment of the disclosed technology.

FIG. 5 is an operating state diagram of the transfer apparatus 100 for the material for the electrode according to an embodiment of the disclosed technology.

When the first reel 10a is completely inserted into the gripping shaft (122 in FIG. 4), the gripping body 121 rotated 180° by the gripping driving member (125 in FIG. 4), and accordingly, the first reel 10a may be disposed in a direction facing the position changing device 130.

The gripping body 121 may move in the −X direction from the apparatus body 110.

When the gripping body 121 reaches a position where the uncoated region 11 of the first reel 10a faces the position changing plate 131, the gripping body 121 may move in the +Z direction or −Z direction so that a center region of the first reel 10a is disposed on an upper portion of the position changing plate 131 in the +Z direction.

Figure 6:
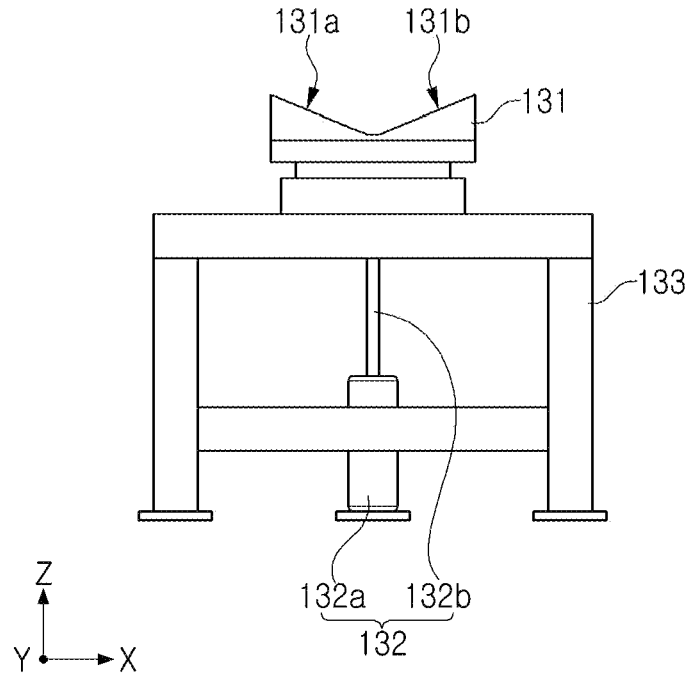
FIG. 6 is a front view of a position changing plate and a position changing moving device according to an embodiment of the disclosed technology.

FIG. 6 is a front view of the position changing plate 131 and the position changing moving device 132 according to an embodiment of the disclosed technology.

As shown in FIG. 6, the position changing plate 131 may have an inclined surface on which the reel (10 in FIG. 5) is seated.

In an embodiment of the disclosed technology, the position changing plate 131 may include a first inclined region 131a inclined at a − slope with respect to the X axis and a second inclined region 131b inclined at a + slope with respect to the X axis.

According to this, when the reel (10 in FIG. 5) is seated, the reel (10 in FIG. 5) may be easily fixed on the position changing plate 131, and the reel (10 in FIG. 5) may be prevented from escaping from the position changing plate 131.

In an embodiment of the disclosed technology, a support frame 133 may be disposed on a lower portion of the position changing plate 131.

The position changing moving device 132 may be disposed on a lower portion of the support frame 133.

The position changing moving device 132 may be a rotatable cylinder.

A cylinder body 132a of the position changing moving device 132 may be disposed on the lower portion of the support frame 133, and a piston rod 132b may extend from the cylinder body 132a in the +Z direction and may be connected to the position changing plate 131.

At this time, an end of the piston rod 132b may pass through the support frame 133 and be connected to a lower surface of the position changing plate 131.

In this case, a bearing (not shown) may be provided between the piston rod 132b and the support frame 133 to prevent rotation of the piston rod 132b from interfering with the support frame 133.

However, this is according to an embodiment of the disclosed technology, and the position changing moving device 132 may be replaced with a motor, etc.

Figure 7:
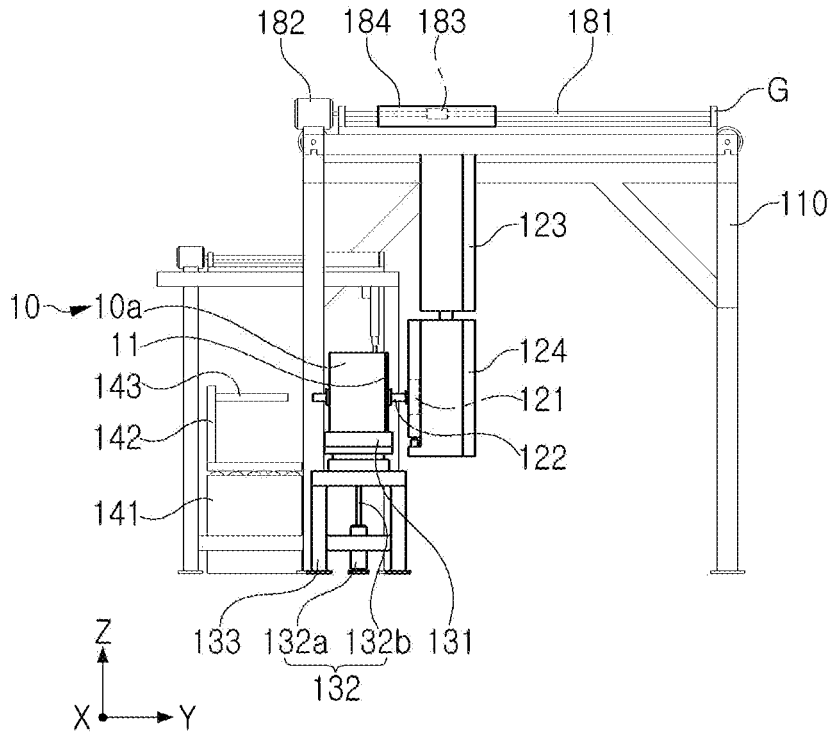
FIG. 7 is an operating state diagram of a transfer apparatus for a material for an electrode according to an embodiment of the disclosed technology.

FIG. 7 is an operating state diagram of the transfer apparatus 100 for the material for the electrode according to an embodiment of the disclosed technology.

As described above, when the gripping body 121 moves in the +Z or −Z direction and the gripping shaft 122 and the first discharge shaft 143 are disposed at the same height in the Z axis, the gripping body 121 may stop moving in the Z axis.

Figure 8:
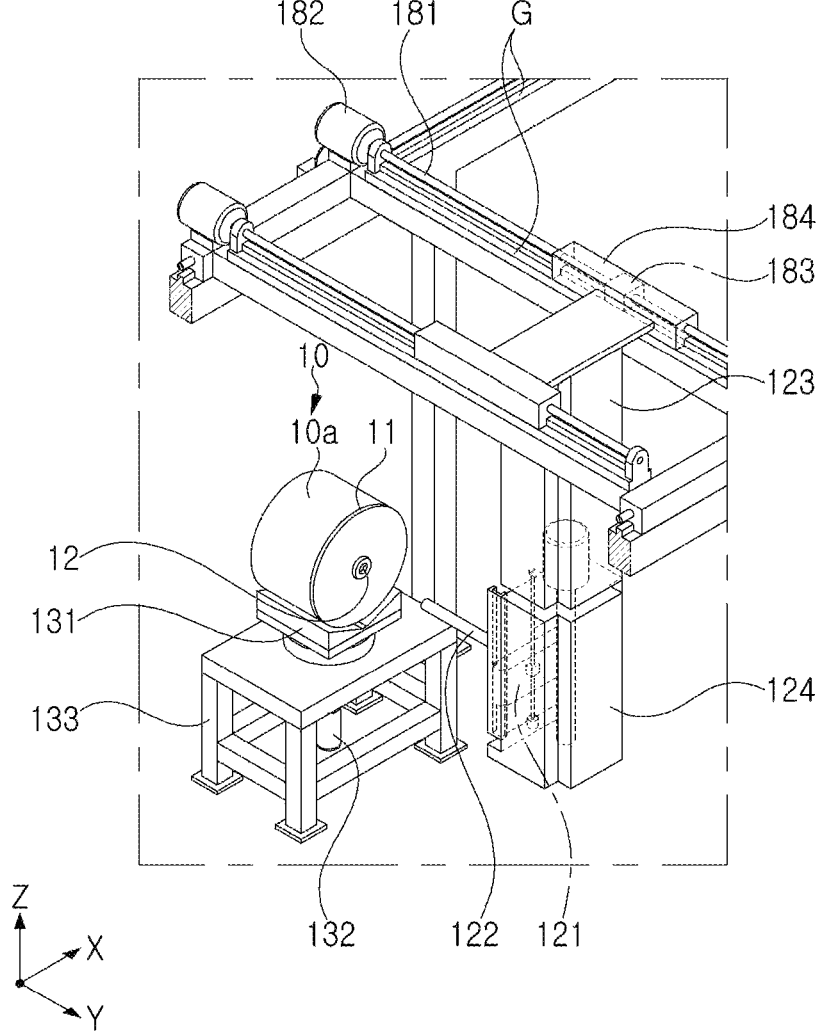
FIGS. 8 to 11 are operating state diagrams of a transfer apparatus for a material for an electrode according to an embodiment of the disclosed technology.

FIG. 8 is an operating state diagram of the transfer apparatus 100 for the material for the electrode according to an embodiment of the disclosed technology.

As shown in FIG. 8, after the apparatus reaches the state shown in FIG. 7, the gripping body 121 may move in the −Y direction to have the first reel 10a disposed on the position changing plate 131.

When the first reel 10a contacts the position changing plate 131, the gripping body 121 may move in the +Y direction.

To this end, the gripping shaft 122 may escape from the insertion region 12 of the first reel 10a.

In this state, when a current collector is unwinding from the first reel 10*a* by holding the end of the first reel the first reel 10*a* may rotate in a clockwise direction.

Figure 9:
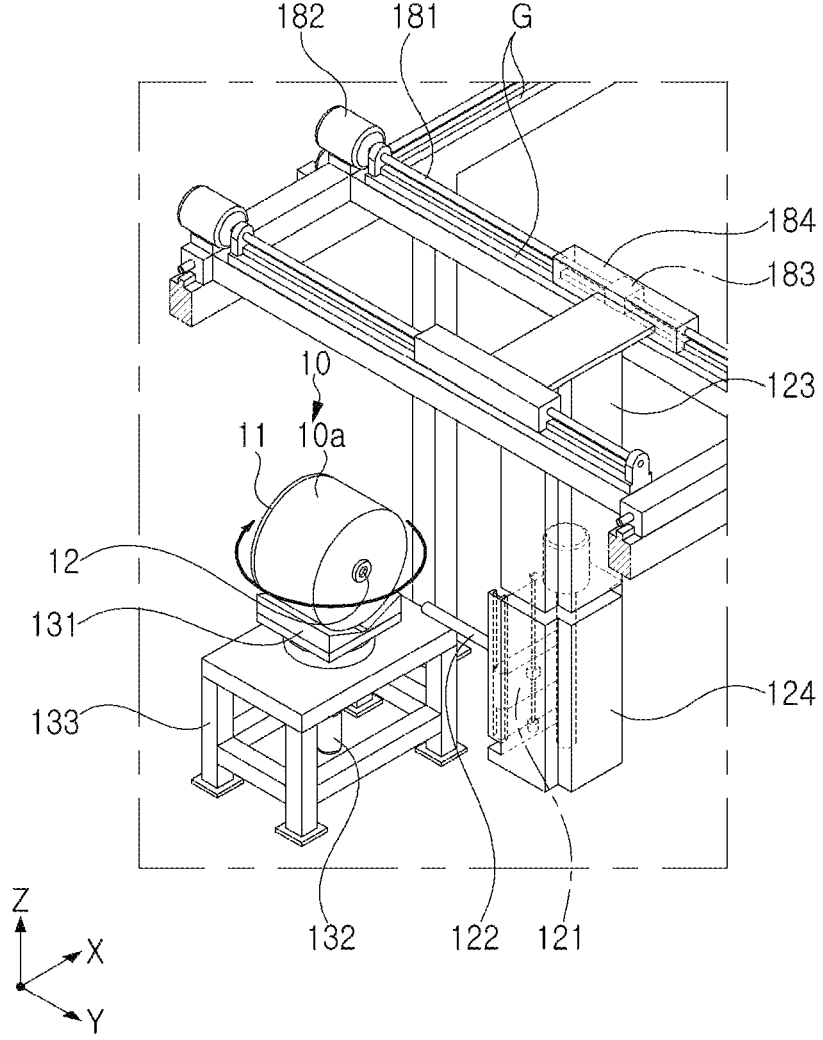

FIG. 9 is an operating state diagram of the transfer apparatus 100 for the material for the electrode according to an embodiment of the disclosed technology.

As shown in FIG. 9, after the apparatus reaches the state shown in FIG. 8, the position changing plate 131 may rotate on the X-Y plane to change the position of the uncoated region 11 of the first reel 10*a*.

In this state, when a current collector is unwinding from the first reel 10*a* by holding the end of the first reel the first reel 10*a* may rotate in a counterclockwise direction.

Subsequently, the gripping body 121 may move in the −Y direction so that the gripping shaft 122 may be inserted into the insertion region 12 of the first reel 10*a*, and the gripping body 121 may move in the +Y direction so that the first reel 10*a* may be withdrawn to the outside of the position changing plate 131.

Figure 10:
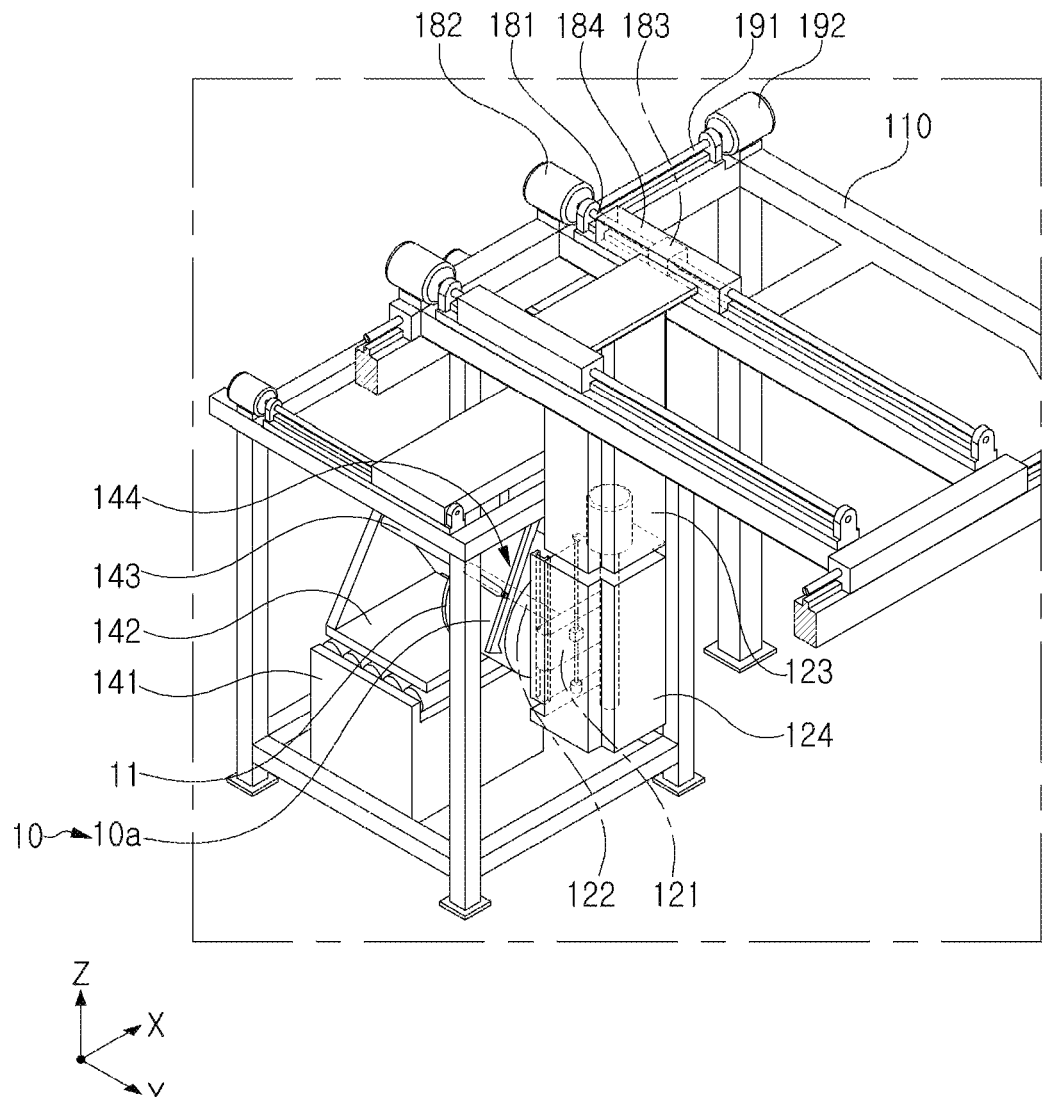

FIG. 10 is an operating state diagram of the transfer apparatus 100 for the material for the electrode according to an embodiment of the disclosed technology.

As shown in FIG. 10, after the apparatus reaches the state shown in FIG. 9, the gripping body 121 may move in the +X direction and stop at a position where the first reel 10*a* faces the first discharge body 142.

In this state, the uncoated region 11 of the first reel 10*a* may face a region existing on the X-Z plane of the first discharge body 142.

Subsequently, the first finger device 144 may move in a direction of the first reel 10*a* and contact the first reel 10*a*.

The first finger device 144 may grab the first reel 10*a* and push and move the first reel 10*a* in the −Y direction.

Accordingly, the first reel 10*a* may be moved from the gripping shaft 122 to the first discharge shaft 143.

Figure 11:
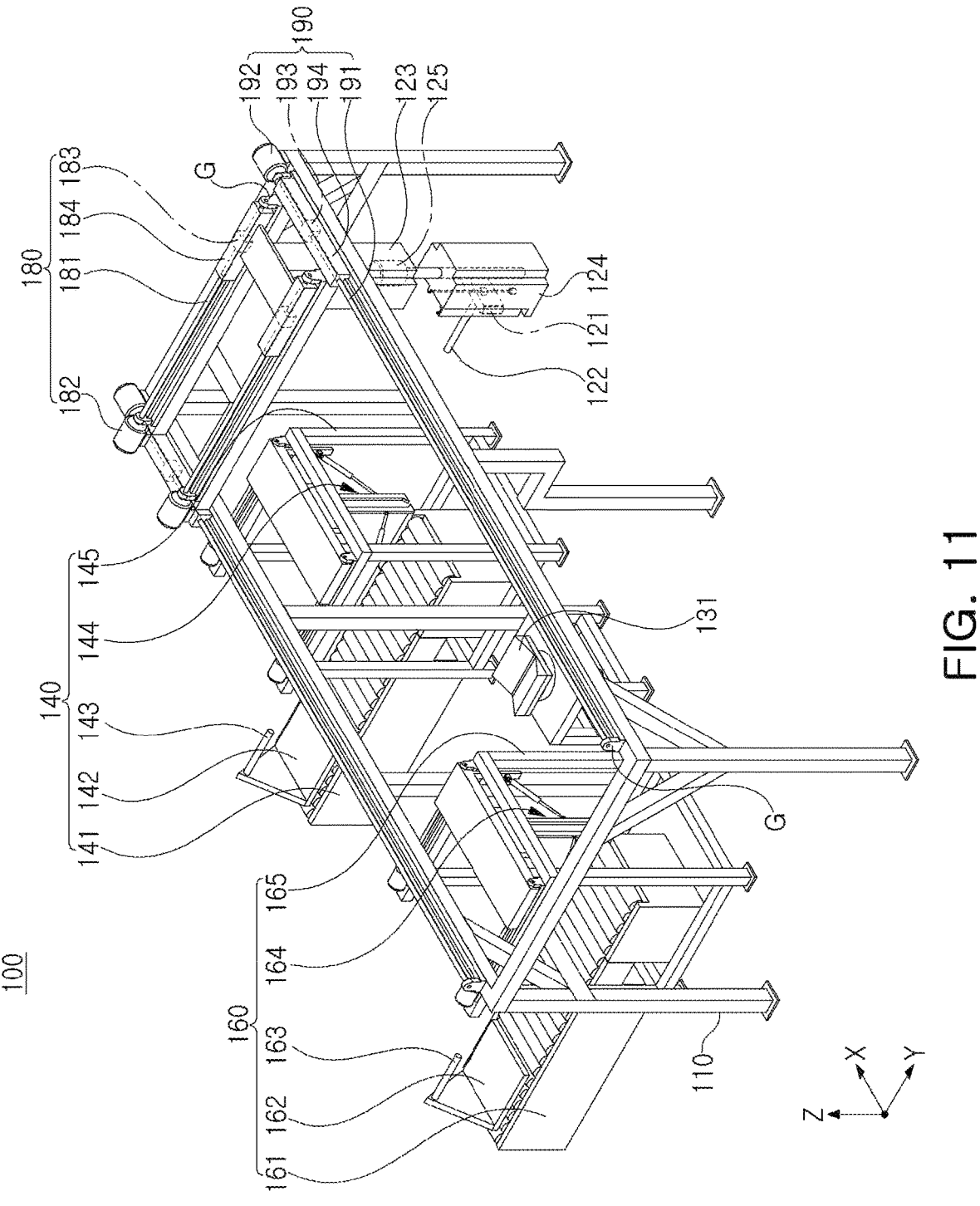

FIG. 11 is an operating state diagram of the transfer apparatus 100 for the material for the electrode according to an embodiment of the disclosed technology.

As shown in FIG. 11, after the apparatus reaches the state shown in FIG. 10, the first conveyor device 141 may move in the −Y direction to move the first discharge body 142 into which the first reel (10*a* in FIG. 10) is inserted to the outside of the apparatus body 110.

The first discharge body 142 may be transported along the first conveyor device 141 through the first path, and returned to an initial position again by the first conveyor device 141 after supplying the first reel 10*a* to a post-process.

At this time, the gripping body 121 may also be returned to the initial position in the apparatus body 110.

The initial position of the gripping body 121 may any one of a position of the first slitter (210 in FIG. 4) facing the first outlet (211 in FIG. 4), a position of the second slitter (220 in FIG. 4) facing the second outlet (222 in FIG. 4), and a position between the first outlet (211 in FIG. 4) and the second outlet (222 in FIG. 4).

According to the above principle, the gripping body 121 may move in a direction of the second outlet (222 in FIG. 4) and pick up the second reel (10*b* in FIG. 4) even from the second outlet (222 in FIG. 4).

However, the uncoated region (11 in FIG. 4) of the second reel (10*b* in FIG. 4) exists in a different direction from the uncoated region (11 in FIG. 4) of the first reel (10*a* in FIG. 4).

Therefore, the gripping body 121 may not have the second reel (10*b* in FIG. 4) seated on the position changing plate 131 but may directly move the second reel (10*b* in FIG. 4) to the second discharge device 160.

The second finger device 164 may be used to insert the second reel (10*b* in FIG. 4) into the second discharge shaft 163.

Subsequently, the second discharge body 162 may be moved in the −Y direction by the second conveyor device 161, and the second reel (10*b* in FIG. 4) may be transferred to a post-process through a second path.

The second discharge body 162 that completes the transfer of the second reel (10*b* in FIG. 4) may be moved in the +Y direction by the second conveyor device 161 and returned to an initial position.

According to this, the reel 10 may be discharged to the outside of the apparatus body 110 while matching positions of the uncoated regions 11.

Therefore, in the post-process of the reel 10, a process of rotating the reel 10 and matching directions of the uncoated regions 11 may be omitted.

This may contribute to improving the efficiency of a battery manufacturing process.

Figure 12:
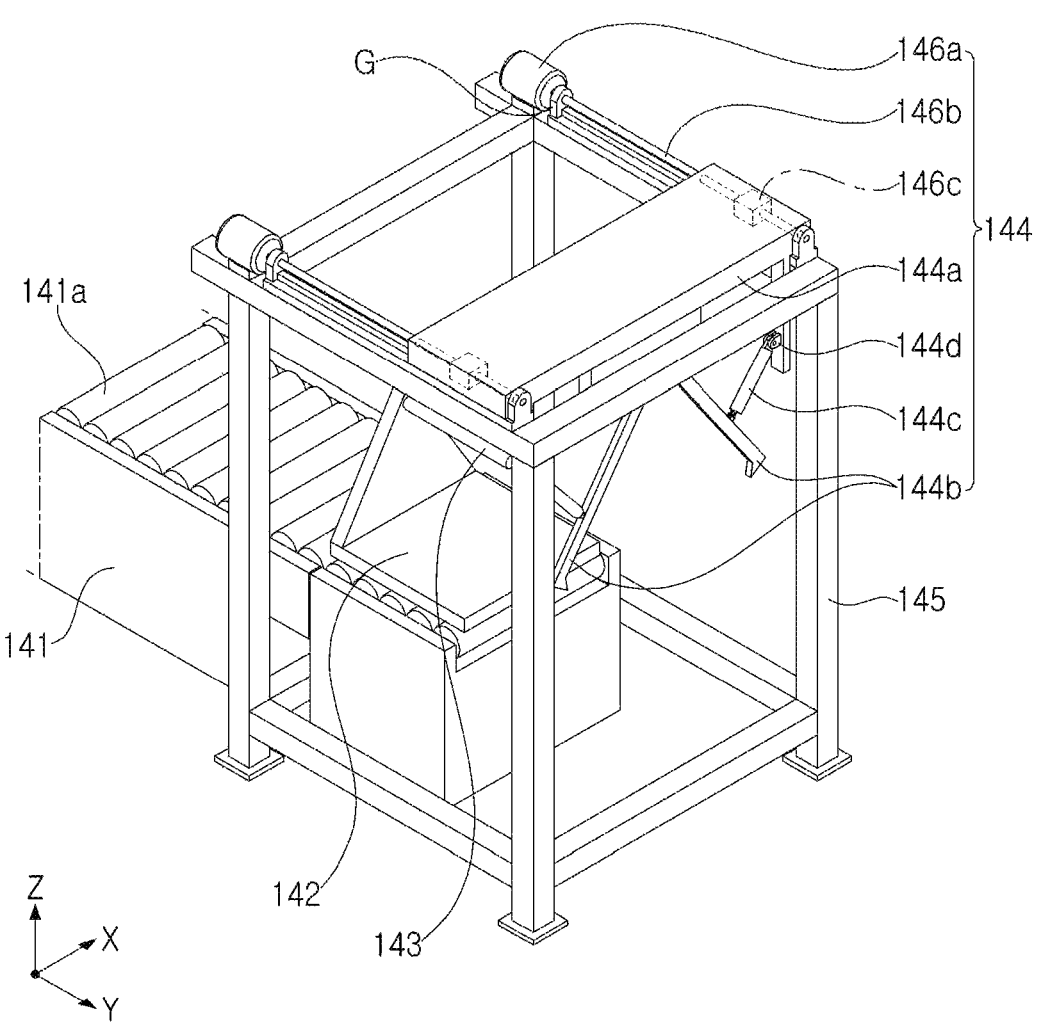
FIG. 12 is a perspective view of a first finger device according to an embodiment of the disclosed technology.

FIG. 12 is a perspective view of the first finger device 144 according to an embodiment of the disclosed technology.

As shown in FIG. 12, the first finger device 144 according to an embodiment of the disclosed technology may be provided to move in the first discharge frame 145.

The first finger device 144 may include a finger driving member 146*a* installed on the first discharge frame 145 and rotating in a clockwise direction or counterclockwise, a finger ball screw 146*b* connected to a rotation shaft (not shown) of the finger driving member 146*a* by a reducer, a finger transfer nut 146*c* engaged with the finger ball screw 146*b* and provided to be linearly moved in the +Y and −Y directions, and a first finger frame 144*a* connected to the finger transfer nut 146*c* and moved along the finger transfer nut 146*c*.

In an embodiment, the guide member G may be installed on the first discharge frame 145, and the guide member G may be an LM guide.

Also, the finger transfer nut 146*c* or the first finger frame 144*a* may move along the guide member G.

A plurality of first finger cylinders 144*c* may be installed on the first finger frame 144*a* by a hinge 144*d*.

Also, the first finger member 144*b* may be connected to each of the plurality of first finger cylinders 144*c*.

The plurality of first finger members 144*b* may be moved in a mutually distant direction or mutually approaching direction by the first finger cylinder 144*c*.

The second finger device (164 in FIG. 3) may be configured according to the same principle as described above.

Meanwhile, in an embodiment of the disclosed technology, the first conveyor device 141 may be a roller conveyor including a plurality of driving rollers 141*a*.

The driving roller 141*a* may rotate in a clockwise direction or in a counterclockwise direction, and may move the first discharge body 142 in the +Y direction or −Y direction by changing a rotation direction thereof.

However, this is not necessarily limited by the disclosed technology, and the first conveyor device 141 may be replaced with a belt conveyor, etc. in addition to the roller conveyor.

Figure 13:
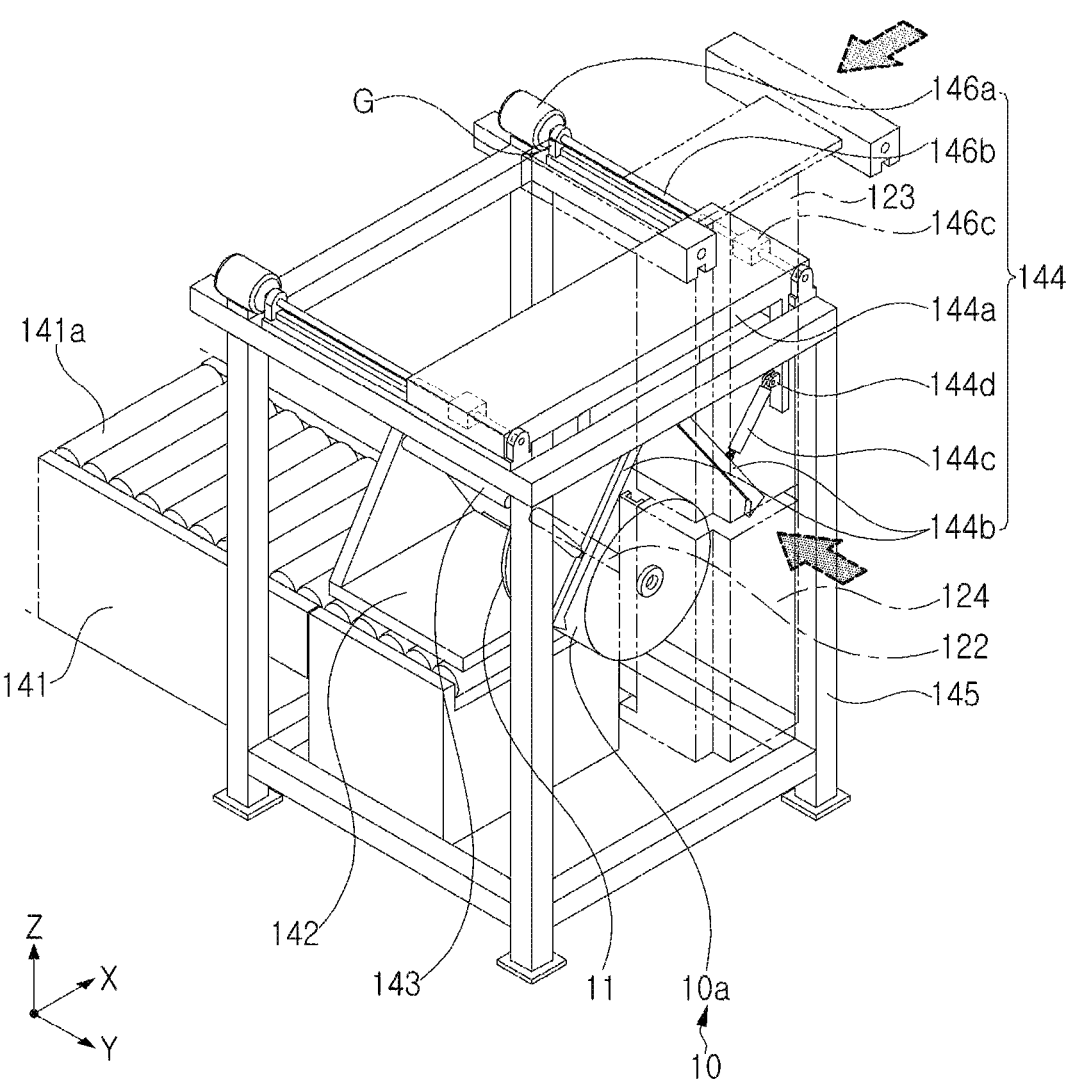
FIGS. 13 to 15 are operating state diagrams of the first finger device according to an embodiment of the disclosed technology.
Figure 14:
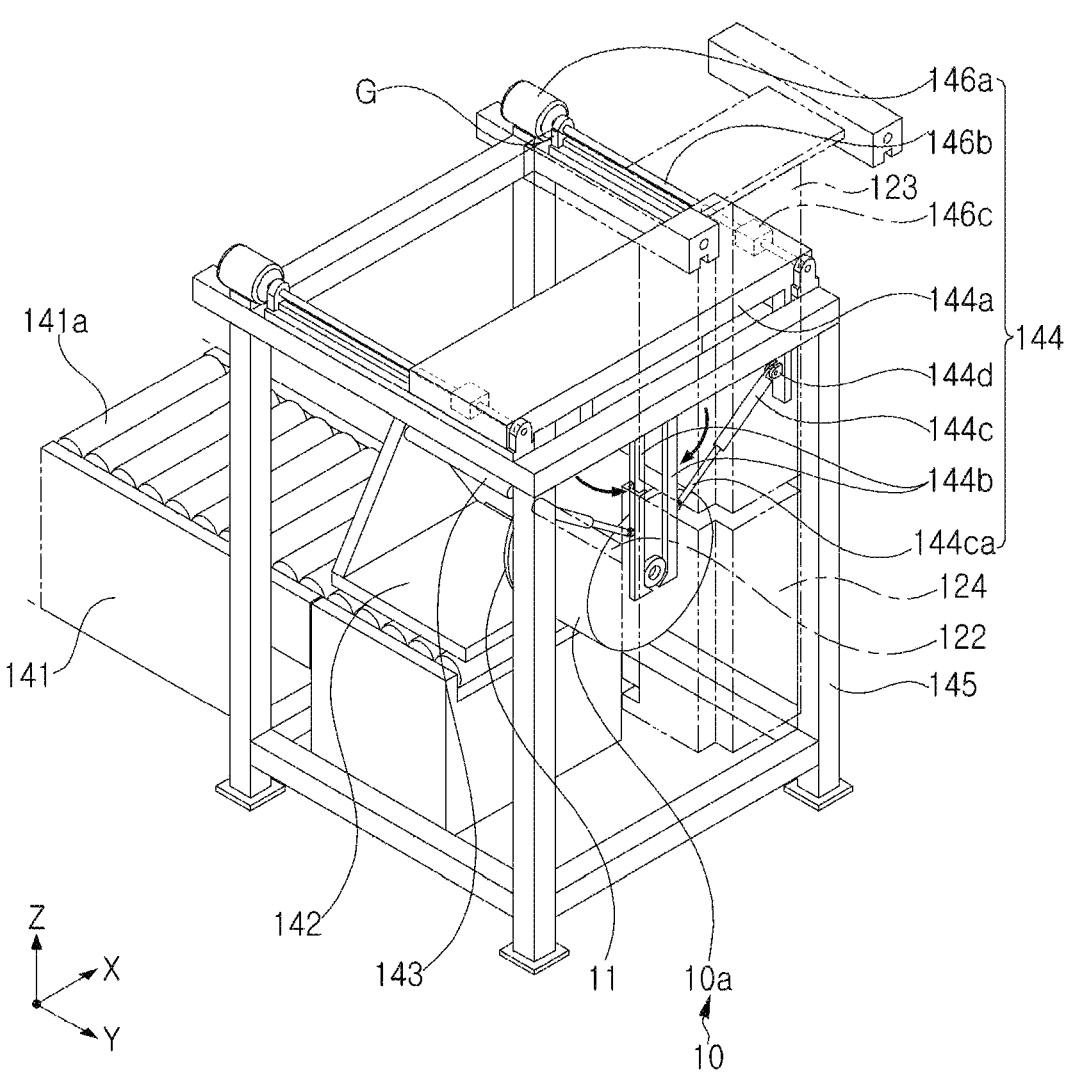
Figure 15:
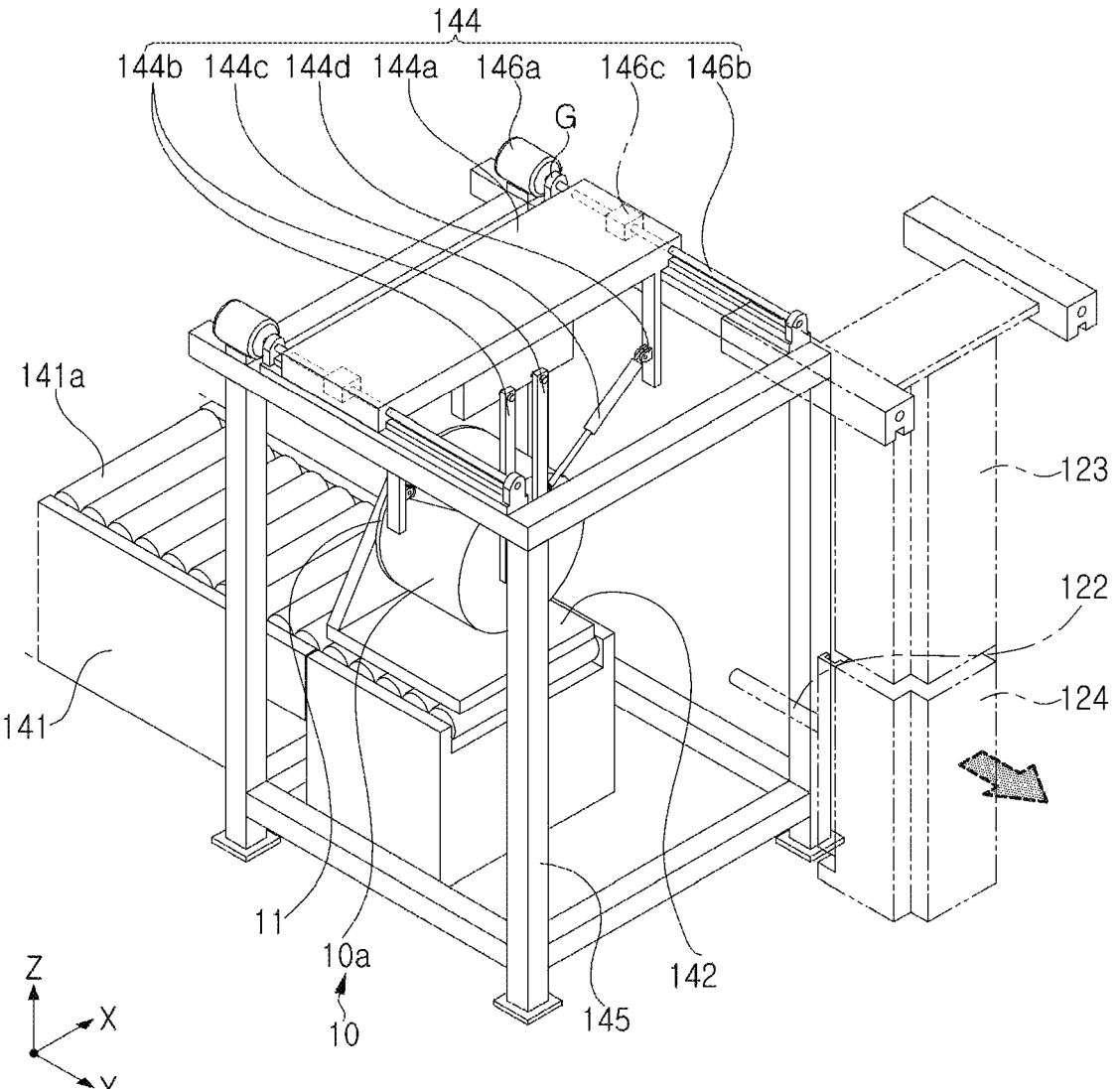

FIGS. 13 to 15 are operating state diagrams of the first finger device 144 according to an embodiment of the disclosed technology.

As shown in FIG. 13, when the gripping body 121 moves the first reel 10*a* to the first discharge body 142, the first reel 10*a* may be positioned between the plurality of first finger members 144*b*.

Then, as shown in FIG. 14, a finger piston rods 144*ca* may be extended in the plurality of first finger cylinders 144*c* so that the plurality of first finger members 144*b* may move in a mutually approaching direction.

Accordingly, the plurality of first finger members 144*b* may contact at least a partial region of the first reel 10*a*.

As shown in FIG. 15, when the first finger frame 144*a* moves in the −Y direction while the plurality of first finger members 144*b* contact at least the partial region of the first reel 10*a*, the first reel 10*a* may move in the −Y direction, and the first reel 10*a* may be moved from the gripping shaft 122 to the first discharge shaft (143 in FIG. 14).

Then, the first discharge body 142 may move in the −Y direction to discharge the first reel 10*a* to the outside of the apparatus body 110, and the first finger frame 144*a* may move in the +Y direction to return to an initial position and wait for a next operation.

According to the disclosed technology as described above, an operation of transferring the reel 10 after a slitting process may be automated.

Therefore, the accuracy and precision of the operation may be increased compared to an operation manually transferred by an operator.

In addition, the convenience of a transfer operation may be improved, and an operation speed may be increased.

This may contribute to improving the efficiency of a battery manufacturing process as well as improving a transfer efficiency of the reel 10.

As set forth above, according to an embodiment in the disclosed technology, a transfer operation of a material for an electrode may be automated and a transfer efficiency of the material for the electrode may be improved.

In addition, according to an embodiment in the disclosed technology, an efficiency of a battery manufacturing process may be improved.

Only specific examples of implementations of certain embodiments are described. Variations, improvements and enhancements of the disclosed embodiments and other embodiments may be made based on the disclosure of this patent document.

The matters described above have been described in relation to an embodiment of the present disclosure, and the scope of the present disclosure is not limited thereto, and it will be apparent to those of ordinary skill in the art that various modifications and variations are possible within the scope without departing from the technical spirit of the present disclosure described in the claims.

What is claimed is:

1. A transfer apparatus for a material for an electrode, the transfer apparatus comprising:
    an apparatus body;
    a gripping device configured to grip a reel wound around a current collector which includes an uncoated region;
    a first moving device connected to the gripping device and the apparatus body and configured to move the gripping device;
    a position changing device configured to rotate the reel when the reel is seated on the position changing device;
    a first discharge device disposed on one side of the apparatus body and configured to move a rotated reel to the outside of the apparatus body when the rotated reel is seated on the first discharge device; and
    a second discharge device disposed on the apparatus body and configured to move an unrotated reel to the outside of the apparatus body when the unrotated reel is seated on the second discharge device, wherein the position changing device rotates the reel to change a position of the uncoated region.

2. The transfer apparatus of claim 1, wherein
    the reel includes a first reel gripped in a first position and a second reel gripped in a second position, and
    the gripping device is configured to seat the first reel on the position changing device and is configured to seat the second reel on the second discharge device.

3. The transfer apparatus of claim 2, wherein the position changing device receives the first reel with a first side of the first reel facing the gripping device and rotates the first reel on the first plane so that a second side of the first reel faces the gripping device.

4. The transfer apparatus of claim 3, wherein
    the first position is a position corresponding to a first outlet of a first slitter, and
    the second position is a position corresponding to a second outlet of a second slitter.

5. The transfer apparatus of claim 4, wherein
    the first discharge device includes a first conveyor device receiving the first reel and moving the first reel along a first path, and
    the second discharge device includes a second conveyor device receiving the second reel and moving the second reel along a second path.

6. The transfer apparatus of claim 1, wherein
    the gripping device includes
    a gripping body connected to the first moving device; and
    a gripping shaft connected to the gripping body and onto which the reel is deposited.

7. The transfer apparatus of claim 6, wherein the first moving device includes
    a first gripping moving device configured to move the gripping body in a first direction relative to the apparatus body;
    a second gripping moving device configured to move the gripping body in a second direction relative to the apparatus body; and
    a third gripping moving device configured to move the gripping body in a third direction relative to the apparatus body.

8. The transfer apparatus of claim 7, wherein each of the first gripping moving device, the second gripping moving device, and the third gripping moving device includes
    a ball screw installed on the apparatus body or the gripping body;
    a motor member rotating the ball screw; and
    a transfer nut connected to the ball screw and the gripping body.

9. The transfer apparatus of claim 1, wherein each of the first discharge device and the second discharge device includes
    a discharge body disposed in the apparatus body;
    a discharge shaft connected to the discharge body and on which the reel discharged from the gripping device is seated; and
    a finger device configured to move the reel from the gripping device to the discharge shaft when the gripping device and the discharge shaft face each other.

10. The transfer apparatus of claim 9, wherein the first discharge device and the second discharge device further include
    a discharge frame disposed to face the discharge body, and
    the finger device includes
    a finger frame connected to the discharge frame so as to be moved relative to the discharge frame; and at least one finger member connected to the finger frame so as to be moved relative to the finger frame, holding the reel present in the gripping device, and moving the reel to the discharge shaft.

11. The transfer apparatus of claim 1, wherein the position changing device includes a position changing plate on which the reel is seated; and a position changing moving device connected to the position changing plate and configured to rotate the position changing plate on the first plane, and the position changing plate includes an inclined region in a surface on which the reel is seated.

12. The transfer apparatus of claim 11, wherein the inclined region includes a first inclined region contacting an outer circumferential surface of the reel and inclined in a first direction; and a second inclined region contacting the outer circumferential surface of the reel and inclined in a second direction.

13. The transfer apparatus of claim 1, wherein the reel includes a first reel aligned having the uncoated region facing a first direction, and a second reel having the uncoated region facing a second direction opposite to the first direction, and wherein the first reel is moved to the outside of the apparatus body by the first discharge device, and the second reel is moved to the outside of the apparatus body by the second discharge device.

\* \* \* \* \*